2 Sheets—Sheet 1.

D. F. SHERBOUDY.
Relief-Valve.

No. 214,719.      Patented April 22, 1879.

Attest:
Jas. Payne.
R. N. Dyer.

Inventor:
Derane F. Sherboudy,
by Geo. C. Tracy & Co.
Attys.

D. F. SHERBOUDY.
Relief-Valve.

No. 214,719. Patented April 22, 1879.

UNITED STATES PATENT OFFICE.

DERANE F. SHERBOUDY, OF CLEVELAND, OHIO.

IMPROVEMENT IN RELIEF-VALVES.

Specification forming part of Letters Patent No. 214,719, dated April 22, 1879; application filed August 21, 1878.

*To all whom it may concern:*

Be it known that I, DERANE F. SHERBOUDY, of Cleveland, in the county of Cuyahoga and State of Ohio, have invented a new and Improved Automatic Relief-Valve; and I do hereby declare that the following is a full and exact description of the same, reference being had to the accompanying drawings and to the letters of reference marked thereon.

My invention relates to certain improvements in self-acting valves, designed to allow the escape of compressed air or steam from the cylinder operating the brake in atmospheric or steam brakes, the object being to allow the escape of the air directly into the atmosphere from the cylinder when it is desired to release the pressure from the brakes without its being necessary for the steam or air to pass from car to car through the various connections to the engine or compressor carried upon the engine. As in operation of the air or steam brakes it is found that there is much difficulty in releasing the brakes quickly where the air or steam is returned from the cylinder to the engine before it can escape, it is the design of my valve to offer a simple and efficient means of allowing the waste air to pass immediately from the brake-cylinder into the atmosphere.

My invention consists of the combination of self-operating valves at a point near the brake-cylinder, so that the inlet or outlet will be opened or closed automatically to allow the admission or escape of the compressed air, according to the necessity of applying or releasing the brakes.

Figure 1:
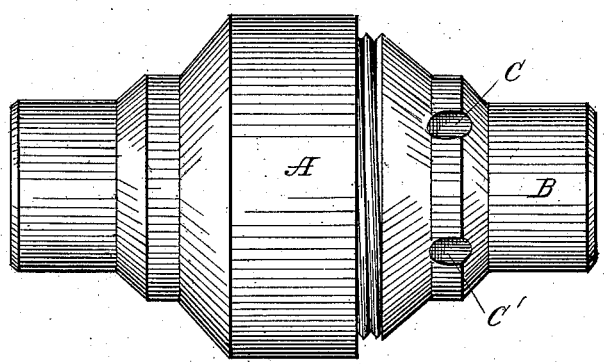
Figure 2:
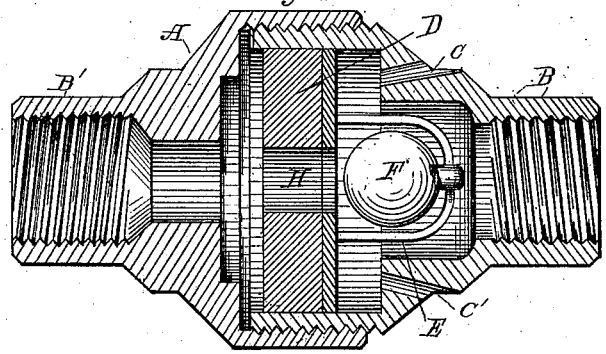
Figure 3:
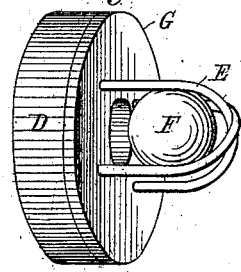
Figure 4:
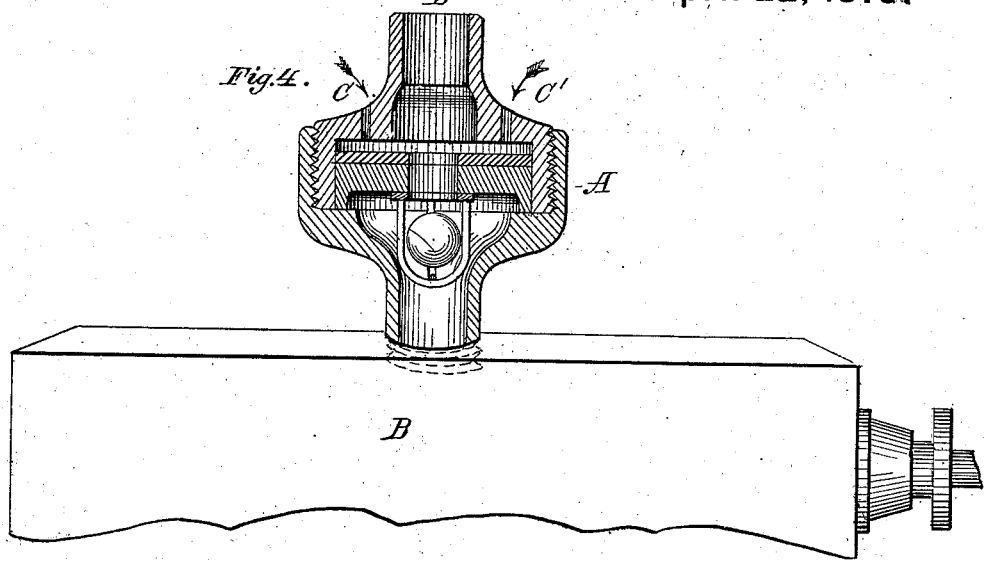
Figure 5:
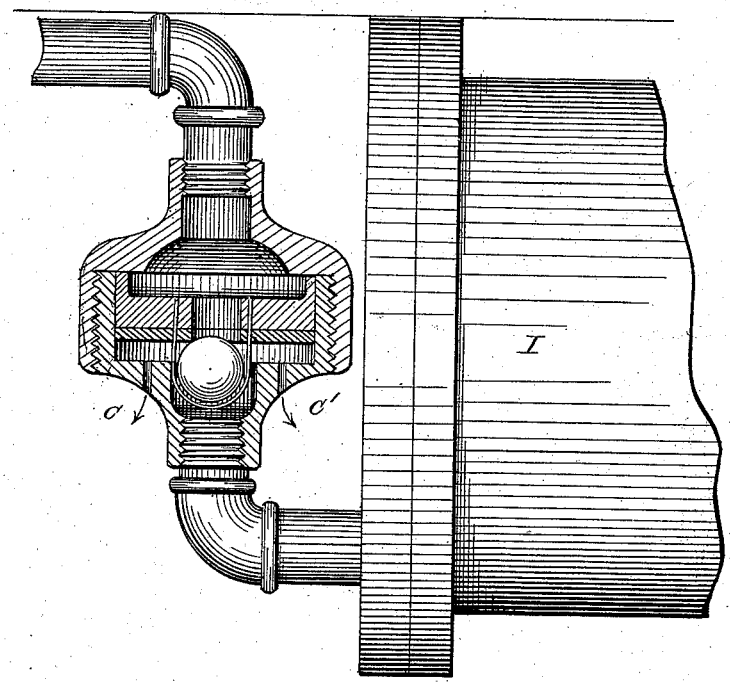

In the drawings, Sheet 1, Figure 1 is an exterior perspective view of my improved relief-valve, and Fig. 2 a section of the same. Fig. 3 is a sliding disk working within the valve. In Sheet 2, Fig. 5 is a view of my valve attached to the brake-operating cylinder. Fig. 4 shows it attached to the steam-chest of an engine.

In Fig. 1, A is the valve-chamber, receiving the part B, which is screwed into it, and in which are drilled the ports C C'. A, Fig. 2, is made hollow, as shown, receiving the threaded part B, in which is fitted the disk-valve D, having the auxiliary ball-valve F held within the wire cage E. D, Fig. 3, is the disk-valve, having a rubber packing, G. E is a cage fastened to the disk and holding the ball F.

In operation the device is attached at B' by screwing into the connecting-pipe of the ordinary form of air-brake, in such a position that the valve will be vertical and the ports C C' open outwardly in a downward direction.

The air being admitted to the cylinder from the engine through the pipe B', the valve D drops, through gravitation, upon and closing the ports C C', but at the same time opening the passage H, the ball F dropping from its seat into the cage E, where it is held at a sufficient distance from the passage H to allow the free movement of air from B' to B, and thence into the brake-operating cylinder, where it may act upon the brakes until, the pressure being relieved at the engine, the course of the air is reversed, and in escaping through the passage H it forces the ball within its seat and diverts the current of air through the ports C C', thus obviating the necessity of its passing back to the engine. When the atmospheric pressure is restored within the brake-operating cylinder through the escape of the compressed air, the valve D will fall back upon the ports C C', which may be of any number or form, and the ball falling and opening the passage H the device is in readiness for a repetition of the operation. These movements are automatically and instantaneously made at the brake-operating cylinder of each car, and a consequent more rapid and efficient operation of the brakes is secured.

By reversing both the chamber A and disk-valve D, with its cage E, I have designed to attach it to the steam-chest of an engine, admitting air to the cylinder when steam is shut off from the boiler and the engine is still in motion, to prevent a vacuum within the cylinder.

In Fig. 4, A is the valve screwed into the top of the steam-chest B.

The operation is as follows: Upon the shutting off of steam the valve will open, the ball and disk both falling from their seats and admitting air through the ports C C' and passage H into the cylinder. Upon the readmission of steam the disk and ball will be raised, closing the openings C C′ and H. It will not be necessary to drill any new openings into the steam-chest, as my valve can be attached in place of an oiler and oil admitted through the top B′.

Having thus described my invention, what I claim as new, and desire to secure by Letters Patent, is—

1. The chamber A, in combination with disk D, cage E, ball F, and ports C C′, as and for the purposes set forth and described.

2. In a valve for air-brakes, the movable disk D, with central opening H, wire cage E, and ball F, substantially as described and shown.

3. An automatic relief-valve for air-brakes, consisting of the chamber A, made in two parts and having ports C C′, the removable disk D, with central opening H, wire cage E, and ball F, all constructed and arranged substantially as and for the purpose set forth.

This specification signed and witnessed this 1st day of June, 1878.

D. F. SHERBOUDY.

Witnesses:
EDW. S. TRACY,
H. McL. HARDING.